July 26, 1966 R. BISCARDI 3,262,415
COLLAPSIBLE SAFETY EMERGENCY TRAFFIC REFLECTOR
Filed Aug. 2, 1965
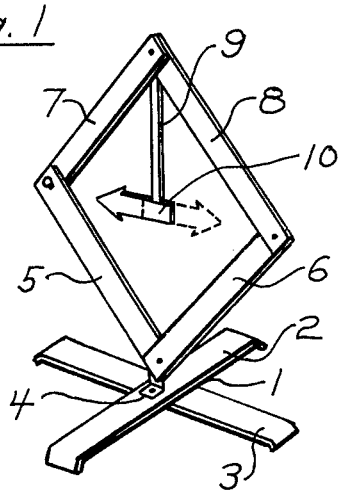
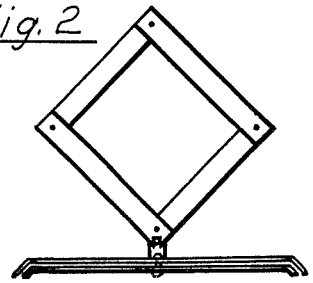
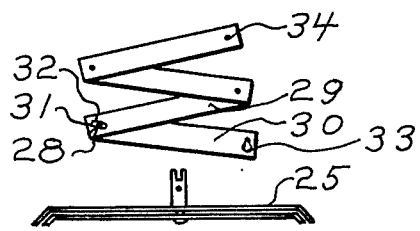
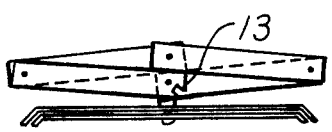
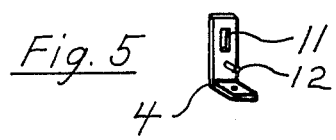
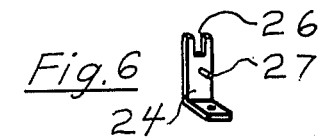
INVENTOR
Rocco Biscardi
By
Robert A. Halvorsen

United States Patent Office 3,262,415
Patented July 26, 1966

3,262,415
COLLAPSIBLE SAFETY EMERGENCY
TRAFFIC REFLECTOR
Rocco Biscardi, 1748 21st St. S., St. Petersburg, Fla.
Filed Aug. 2, 1965, Ser. No. 476,255
2 Claims. (Cl. 116—63)

This invention relates to devices to be placed near motor vehicles which are stopped on or near streets and highways to warn drivers of other vehicles to avoid the stopped vehicle.

Motor trucks are required by the Interstate Commerce Commission to carry such safety devices, and safety bureaus advocate this practice by private automobilists. As traffic volume increases, and highway speed increase, it has become increasingly dangerous for a disabled motor vehicle to stop on traffic lanes or even on the edges of such lanes.

Various devices have been developed for such service, but all of those heretofore known have been impractical because of high cost of manufacture, short useful life, relative ineffectiveness as a warning, cumbersome storage problem in the motor vehicle, or inconvenience in use.

It is the prime object of this invention to provide such a warning device which will effectively warn drivers of high speed motor vehicles under varying conditions of visibility.

Another object is to provide a device which can be inexpensively produced, and which will retain its utility over a period of many years.

Another object is to provide a warning device which can be easily manipulated by persons of little strength or mechanical ability.

It is also an object of this invention to provide a warning device which conforms in appearance to the internationally approved "diamond" shape for all "warning" signs on highways.

A still further object is to provide a device which can conveniently be carried in a motor vehicle without damage to expensive luggage or other articles which may be placed in the luggage compartment along with the device.

Another object is to provide a warning device which can be adjusted to direct approaching vehicles to keep to the right or to the left side of the warning device.

Other objects will be apparent to one skilled in the art from a consideration of the following description and drawings in which FIGURE 1 shows a perspective view of a preferred embodiment. FIGURE 2 is a front view of the preferred embodiment. FIGURE 3 is a front view of the preferred embodiment with supporting legs and signal arms in collapsed position for storage. FIGURE 4 is a front view of an alternative embodiment with supporting legs disconnected from the signal arms which are shown in semi-collapsed position. FIGURE 5 is a detailed perspective of the bracket used with the preferred embodiment. FIGURE 6 is a perspective of the bracket used with the alternate embodiment.

In the drawings 1 represents generally a base comprising a leg 2 which is pivotally connected at its center to a similar leg 3.

Projecting upwardly from the middle of leg 2 is a bracket 4 to which is attached two signal arms 5 and 6 which extend upwardly at angles of 45° from the horizontal. At the upper ends of arms 5, 6 are pivotally connected two similar arms 7, 8 which extend upwardly toward each other and which are pivotally connected at their upper ends.

Arms 5, 6, 7 and 8 are all of the same length and general proportions so that they together form a square geometric relation which is commonly termed a diamond.

A link 9 is supported by the same pivotal connector, preferably a rivet, which joins arms 7 and 8. At the outer ends of link 9 is pivotally connected a piece of sheet material in the form of an arrow 10. This arrow may thus be extended above the diamond, or may be positioned at the center of the diamond by pivoting link 9 to extend upwardly or down. Similarly, arrow 10 may be pivoted to point right or left, in either the upper or lower position of link 9.

The elements of this device heretofore described are preferably made of inexpensive sheet metal, coated with a reflective or fluorescent paint and joined at each pivotal connection by rivets. Alternately, flat strips of wood, plastic or other materials may be used; and the rivets may be replaced with screws, bolts and other pivoting devices to provide a suitable frictional engagement between the several elements such that the elements will retain the desired configuration after they have been properly adjusted.

The preferred embodiment as shown in FIGURE 2 provides for permanent assembly of all of the elements of the device. In this arrangement bracket 4 has a vertically elongated slot 11 through which slidably passes the rivet used to join arms 5 and 6. Below slot 11 is a pin 12 which projects horizontally from bracket 4 to engage open slots 13 formed at the lower ends of arms 5 and 6. The engagement of pin 12 in slots 13 prevents the pivoting of arms 5 and 6, and effectively locks the assembly of signal arms in the desired diamond configuration.

To collapse the device for storage after use it is simply necessary to lift slots 13 out of engagement with pin 12 and then to spread apart the opposite pairs of arms which causes the uppermost pivotal connection to move down until it almost coincides with the lowermost pivotal connection. Legs 2 and 3 are then pivoted to aline with the collapsed arms and the entire assembly may be conveniently stored next to the spare tire in most luggage compartments.

The alternate embodiment shown in FIGURE 4 involves slightly more effort in assembly and dis-assembly, but can be more compactly stored than the preferred embodiment. This is accomplished by permitting the complete separation of the legs from the signal arms, and the collapse of the four signal arms by the removal of one of the pivotal connectors.

In the alternate embodiment an upstanding bracket 24 is rigidly attached to the middle of the upper leg 25, and has a slot 26 open at its top. Below slot 26 is a pin 27, which projects horizontally and is proportioned for slidable engagement in open ended slots 28 which are provided at the lower ends of the two arms 29, 30. Arms 29, 30 are pivotally connected by a bolt 31, which is proportioned to slidably fit within slot 26, and a wing nut 32 which may be twisted to positively fasten arms 29 and 30 to bracket 24.

The signal arms in this alternate arrangement are pivotally connected at their ends to each other, but to permit compact storage one of said pivots may be disengaged by means of a conventional bayonet slot 33 which at its large end is proportioned to permit the release of the corresponding rivet head 34.

Although I have described in particularity two embodiments of my invention, I do not intend to be limited except within the scope of the appended claims.

I claim as my invention:
1. In a device of the character described a signal device comprising four flat arms of equal length, each said arm being pivotally connected at each end to one of the other arms, a base comprising two elongated legs pivotally connected at their midpoints, an upstanding bracket projecting above said base, said bracket including an elongated vertical slot and a horizontally projecting pin beneath said slot, a pivot pin in one of said pivotal connections projecting through said slot, and elongated slots in the ends of the arms adjacent said pivot pin adopted to receive said horizontally projecting pin.

2. In a device of the character described a signal device comprising four flat arms of equal length, pivotal means at the extremities of each arm to engage the extremity of another arm, one of said pivotal means comprising a bayonet slot adopted to permit the disengagement of one of the pivotal engagements, a collapsible base adapted to rest upon a horizontal surface and having rigidly attached thereto a connector bracket projecting upwardly therefrom, an elongated slot in said bracket with an open upper end, and a bolt comprising one of said pivotal means adapted to fit within said elongated slot for attachment of said signal device to said bracket.

References Cited by the Examiner

UNITED STATES PATENTS 3,135,235   6/1964   Romano _____ 116—63

FOREIGN PATENTS

| 495,840 | 6/1950 | Belgium. |
| 1,123,950 | 6/1956 | France. |
| 1,125,120 | 7/1956 | France. |
| 532,966 | 9/1931 | Germany. |
| 460,350 | 11/1950 | Italy. |
| 64,607 | 2/1928 | Sweden. |
| 368,079 | 4/1963 | Switzerland. |

LOUIS J. CAPOZI, *Primary Examiner.*